United States Patent
Chen et al.

(10) Patent No.: US 9,311,345 B2
(45) Date of Patent: Apr. 12, 2016

(54) TEMPLATE BASED DATABASE ANALYZER

(71) Applicant: SAP AG, Walldorf (DE)

(72) Inventors: Yingyu Chen, Shanghai (CN); Xin Xu, Shanghai (CN); Xiwei Zhou, Shanghai (CN); Jing Gu, Shanghai (CN)

(73) Assignee: SAP SE, Walldorf, DE (US)

( * ) Notice: Subject to any disclaimer, the term of this patent is extended or adjusted under 35 U.S.C. 154(b) by 361 days.

(21) Appl. No.: 13/648,043

(22) Filed: Oct. 9, 2012

(65) Prior Publication Data

US 2014/0101097 A1   Apr. 10, 2014

(51) Int. Cl.
   *G06F 17/30*   (2006.01)

(52) U.S. Cl.
   CPC .... *G06F 17/30306* (2013.01); *G06F 17/30398* (2013.01)

(58) Field of Classification Search
   None
   See application file for complete search history.

(56) References Cited

U.S. PATENT DOCUMENTS

| | | | |
|---|---|---|---|
| 6,453,269 B1 * | 9/2002 | Quernemoen | 702/186 |
| 7,539,660 B2 * | 5/2009 | Focazio | G06F 17/30454 |
| 2005/0065948 A1 * | 3/2005 | Slutz | 707/100 |
| 2009/0138467 A1 * | 5/2009 | Hunur et al. | 707/5 |

OTHER PUBLICATIONS

"In-memory Database Systems Questions and Answers" Aug. 2009.*

* cited by examiner

*Primary Examiner* — Miranda Huang
(74) *Attorney, Agent, or Firm* — Fountainhead Law Group PC (57) ABSTRACT

An automated database analyzer is uses templates to accommodate multiple database languages, such as SQL and its dialects. The templates are combined with metadata that define a database schema and operations on the database schema. An SQL file instantiates the database schema on a database system being tested. Operations on the database schema may then be performed to assess the performance of the database system being tested.

19 Claims, 6 Drawing Sheets

TEMPLATE BASED DATABASE ANALYZER

BACKGROUND

Unless otherwise indicated herein, the disclosures in this section are not admitted to be prior art by inclusion in this section.

Database products are becoming an increasing common element of a business enterprise. In-memory database technologies such as the SAP HANA® database produce are becoming more popular. Database designers have a wide range of technologies and design choices for implementing backend database systems in an enterprise. However, each database product has its strong points and its weak points. A database designer must therefore be able to select the most suitable database product for their particular application.

Typically, database designers spend quite a bit of time researching and identifying database candidates. Evaluation tools exist to assess a database's performance metrics, but the limited scope of functionality provided the by the evaluation tools limits the usefulness of the performance metrics. For example, typical evaluation tools focus on one or a few specific areas, and so the database designer can assess only a small part of the entire database product. Evaluation tools are typically specific for a given database product, and so testing across different database products with the same tool is not easily accomplished. Typical evaluation tools include:

- DTM DB Stress—This evaluation tool provides stress testing only.
- Agile Database Tools—This suite of tools only supports testing on database systems designed around the so-called Agile Data Method.
- Online Database Functions Testing Tool—This tool only supports Oracle® function unit testing.
- Hibernate—This tool only supports create, read, update, delete (CRUD) logic with low coverage for structured query language (SQL) statements.

Database products typically have their own native performance benchmarks, functionality specs., simple test tools, and so on. However, the tools cannot accommodate different combinations of hardware environments and application requirements. In addition, there usually is no support for secondary development because of limited and proprietary application programming interfaces (APIs) to the database product.

DETAILED DESCRIPTION

Disclosed embodiments relate to methods and systems for generating and running test scenarios to assess performance in a database system. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
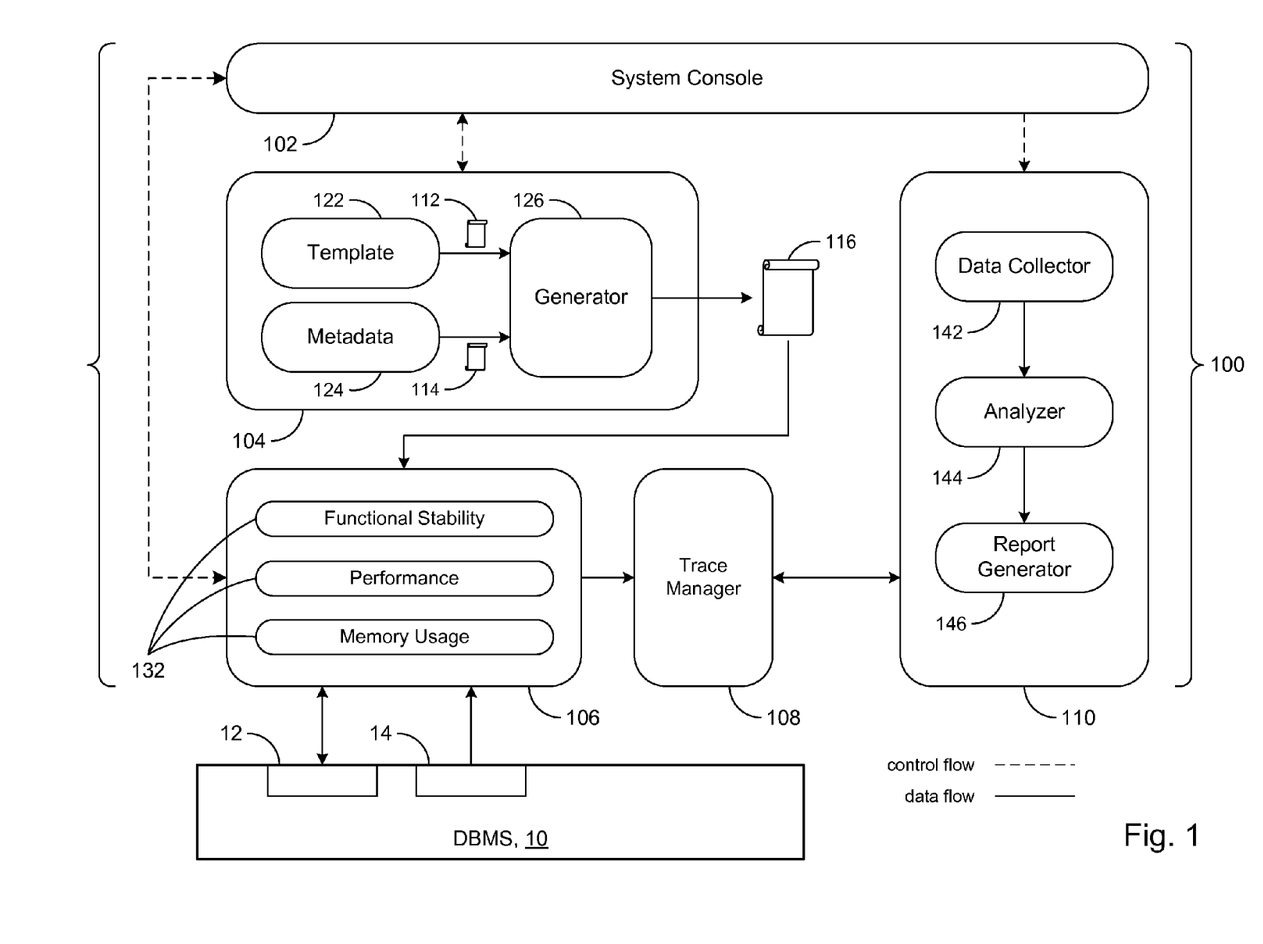
FIG. 1 illustrates an example of a configuration of a database analyzer in accordance with the present disclosure.

FIG. 1 shows a configuration of a database analyzer 100 in accordance with embodiments of the present disclosure. The database analyzer 100 is shown configured with a database management system (DBMS) 10 whose performance is to be assessed by the database analyzer. The database analyzer 100 may interface with the DBMS 10 via a database API 12 and a database performance API 14. The database API 12 allows an application (e.g., the database analyzer 100) to communicate with the DBMS 10 to perform database operations such as creating and deleting database tables, adding, modifying, and deleting data in the database tables, querying the database tables, and otherwise accessing the DBMS. The database performance API 14 allows an application such as the database analyzer 100 to access performance data generated by the DBMS 10 during operation of the DBMS. Performance data may include data such as memory usage, CPU usage, page swapping, and so on. The specific kind of data may vary from one DBMS to another.

In some embodiments, the database analyzer 100 may comprise a system console 102, a structured query language (SQL) generator 104, an analysis runner 106, a trace manager 108, and a report center 110. The system console 102 may serve as a management interface for functions performed by the database analyzer 100. In some embodiments, a user (e.g., a database administrative user) may access the system console 102 using a command line interface (CLI). It will be appreciated of course that in other embodiments, other interface designs may be used.

The user may access the database analyzer functionality via the system console 102. The system console 102 may control operation of the other modules that comprise the database analyzer 100 in response to the user's input. The system console 102 may coordinate actions among the modules. The user may obtain current process status information of test runs being performed by the database analyzer 100, performance information about ongoing or previous test runs, and so on. The user may initiate "single runs" of a test scenario, or a "loop run" of the test scenario.

As will be discussed below, a test run refers to running a test scenario, and a test scenario refers to a series of database operations on the DBMS 10. A test scenario may specify a database schema to be created in the DBMS 10, and a set (e.g., hundreds to thousands) of database statements that are applied to the database schema to simulate a live environment of users of the database schema. Running a test scenario therefore serves to test the capabilities of the DBMS 10, the performance of the DBMS, and so on. A "single run" refers to executing the test scenario once and generating performance results from performance data collected during the run, while a "loop run" refers to executing the test scenario multiple times, accumulating the performance data from each execution run, and generating performance results from the accumulated performance data (e.g., by averaging the data). In a typical use case, the user may initially perform a single run of the test scenario to verify the database operations of the test scenario and to identify any logic errors, allowing for the user to troubleshoot and refine the test scenario as needed. After the test scenario is verified, performance assessment may be conducted by performing one or more loop runs of the test scenario. Additional details of a test scenario will be described below.

Continuing with FIG. 1, the SQL generator 104 may serve to generate SQL files that constitute the test scenarios. Although disclosed embodiments show the use of SQL as the database language of the DBMS 10, it is noted that database languages other than SQL may be supported. An SQL file comprises the SQL statements for exercising the DBMS 10 in accordance with a test scenario. The test scenario may be embodied in the SQL statements that comprise an SQL file. The test scenario may include performing SELECT operations, JOIN operations, various aggregation operations, and so on. The test scenario may comprise any combination and number of SQL statements.

In some embodiments, the SQL generator 104 may comprise a template provider 122, a metadata provider 124, and a generator 126. The template provider 122 may access a data store (not shown) of template files to provide a selected template file 112 to the generator 126. The metadata provider 124, likewise, may access a data store (not shown) of metadata files to provide a selected metadata file 114 to the generator 126. The generator 126 may then use information contained in the selected template file 112 and the selected metadata file 114 to produce an SQL file 116. Template files and metadata files will be discussed in more detail below.

The analysis runner 106 may scan the SQL file 116 to run the test scenario embodied in the SQL statements in the SQL file against the DBMS 10. Accordingly, in some embodiments, the analysis runner 106 may interface with the DBMS 10 via the database API 12 in order to issue SQL statements to the DBMS 10 and to receive responses from the DBMS.

In some embodiments, the analysis runner 106 may include several test modules 132 for running the test scenario. Each test module 132 may test the DBMS 10 in a specific way to assess a particular aspect of the DBMS. For example, a functional stability module may assess how well the DBMS 10 can handle certain functions such as aggregation of large database tables, and so on. A performance module may assess the execution times of operations in the DBMS 10 when processing database operations; e.g., SELECT operations, JOIN operations, and so on. A memory usage module may assess the memory management capability of the DBMS 10; e.g., peak memory usage may be monitored. And so on. Accordingly, the analysis runner 106 may interface with the database performance API 14 in order to gather performance data and other environment information, collectively referred to herein as "performance data", that is generated and provided by the DBMS 10.

In some embodiments, the trace manager 108 may receive performance data collected by the analysis runner 106. The trace manager 108 may store the performance data for each run, whether from a single run or multiple runs of a loop run. The trace manager 108 may also store and manage system logs and other information related to runs of a test scenario.

The report center 110 may receive data as a data stream from the trace manager 108 and prepare reports on performance of the DBMS 10. In some embodiments, the report center 110 may comprise three configurable components. A data collector 142 may choose the data that a user wants to generate a report for. In some embodiments, the data collector 142 may be a file scanning and data filtering application implemented in standard Java file manipulating API. The user may define a filter type that the data collector 142 uses to retrieve data in the data stream from the trace manager 108. Merely as an example, suppose the user wants to report two days worth of data from a run of a test scenario. A "date filter" may be used to filter for data matching the two days of interest. Additional data filters may be used to filter for specific kinds of data; e.g., memory usage data, processor usage data, and so on.

The report center 110 may include an analyzer 144 that performs various calculations on the data received by the data collector 142. Calculations may include averages and variances, statistical analyses, trend analyses, predictive modeling, and so on. Analytics generated by the analyzer 144 may be provided to a report generator 146 to report on the analytics. The analytics may be presented in any suitable format. For example, the Flex reporting tool may be used to render reports for delivery to web users. The report may be formatted in an Excel® file, and so on. The analytics may include charts such as bar charts, pie charts, line charts, and so on.

Figure 2:
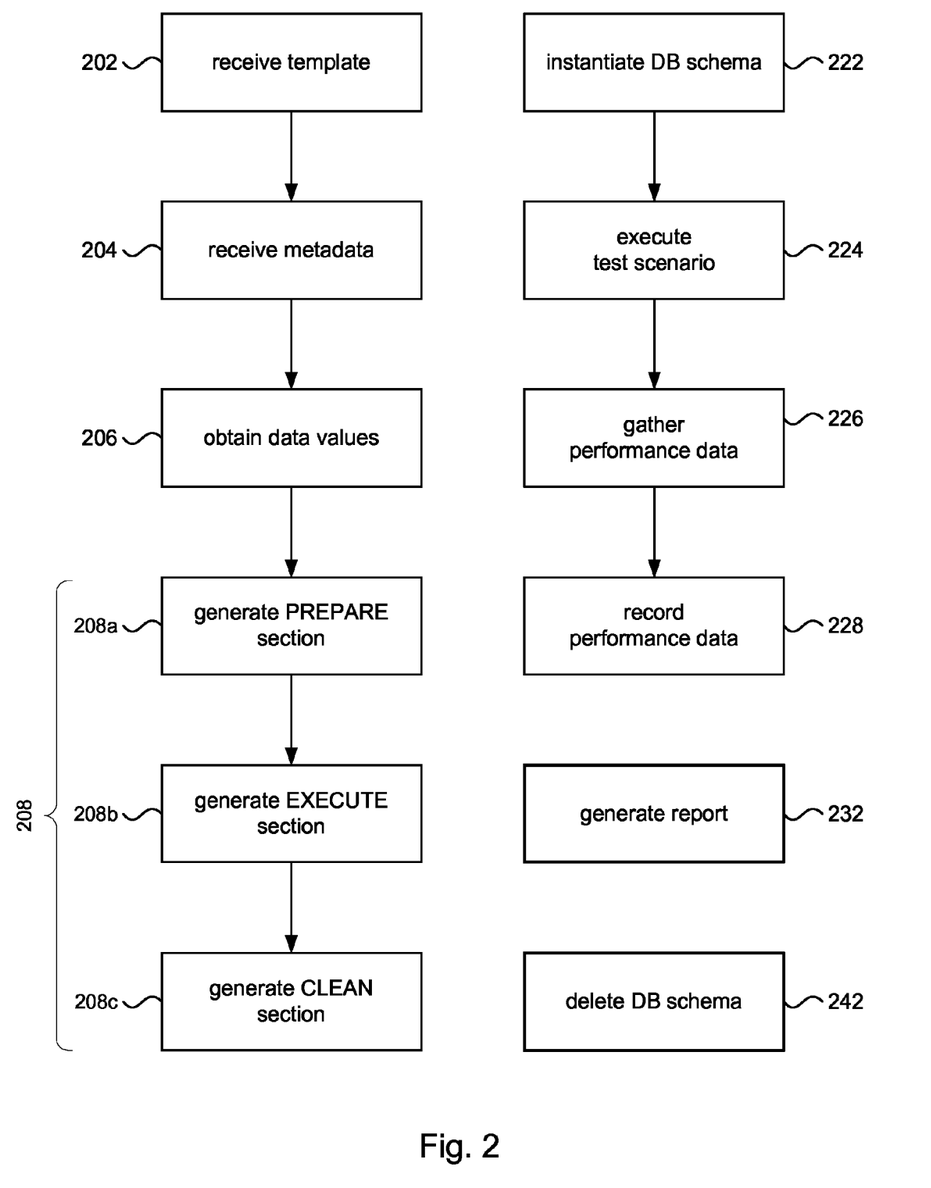
FIG. 2 represents a workflow in an embodiment of the database analyzer.

FIG. 2 shows a typical workflow of the database analyzer 100 in accordance with some embodiments. Thus, at 202, the database analyzer 100 may receive a template file (e.g., the template provider 122 provides template file 112 to the generator 126). As will be explained in more detail below, a template file specifies the grammar and syntax of the database language (e.g., SQL) that is used by DBMS 10. The user may specify via the system console 102 a template file from among a repository of predefined template files. In some embodiments, the user may modify a predefined template file, which the template provider 122 may then provide to the generator 126 as a customized template file. In some embodiments, the user may define their own customized template file "from scratch." The customized template file may be added to the repository of predefined template files for future use.

At 204, database analyzer 100 may receive a metadata file (e.g., the metadata provider 124 provides metadata file 114 to the generator 126). As will be explained in more detail below, a metadata file defines a test scenario and specifies a database schema and database operations to be performed on the database schema. The user may specify via the system console 102 a metadata file from among a set of predefined metadata files. In some embodiments, the user may modify a predefined metadata file, which the metadata provider 124 may then provide to the generator 126 as a customized metadata file. In some embodiments, the user may define their own customized metadata file "from scratch." The customized metadata file may be added to the repository of predefined metadata files for future use.

At 206, the database analyzer 100 may obtain data values that will be loaded into the database tables that comprise the database schema specified in the metadata file received at 204. In some embodiments, the data values may be obtained from the user's actual database system (not shown in the figures). Merely as an example, suppose the DBMS 10 is a candidate database system that the user is considering as a replacement for their existing database system. Accordingly, the data values that are to be loaded into the database schema may be obtained from the user's existing database system. For example, the database analyzer 100 may be interfaced to the user's existing database system using a suitable API. At 206, the user may specify which database tables in their existing database system to obtain data values from.

In other embodiments, the data values at 206 may be randomly generated by one or more random value generators in the generator 126. For example, the generator 126 may include a random generator to generate random text, another random generator to generate random numbers, and so on. The use of randomly generated data values may be preferable where the data is sensitive; e.g., where issues of private information may be involved. For example, employee salaries, medical information, and so on, may very well be private sensitive information that should remain confidential.

Accordingly, the data values used in a test scenario that are deemed sensitive or confidential may be replaced by randomly generated values. In some embodiments, the data values obtained at 206 may comprise data values from the user's existing data base system and randomly generated data values.

At 208, the database analyzer 100 may generate a test scenario that comprises a set of SQL statements stored in an SQL file. For example, the user may enter a command from the system console 102 to initiate generating a test scenario using the specified template file, the specified metadata file, and a source of data values (from the user's existing database system, randomly generated, or some combination of both).

The test scenario may specify a database schema that is created on the DBMS 10 being assessed, and database statements for accessing and otherwise operating on the database schema. Accordingly, in some embodiments, the database analyzer 100 (e.g., via the generator 126) may generate at 208*a* a set of SQL statements for creating the database schema, e.g., a series of SQL CREATE statements. The SQL statements may include INSERT statements to load the database schema with data values. These SQL statements may constitute a PREPARE section in the SQL file. At 208*b*, the database analyzer 100 may generate a set of SQL statements that access or otherwise operate on the database schema. These statements constitute the database operations that exercise the DBMS 10, and may form the basis on which performance of the DBMS will be assessed. These statements may be stored in an EXECUTE section of the SQL file. In some embodiments, clean-up SQL statements may be generated at 208*c* for deleting the database schema after testing of the DBMS 10 has concluded. These statements may constitute a CLEAN section of the SQL file.

In accordance with principles of the present disclosure, the generator 126 may use the grammar and syntax specified in the template file received at 202 and specifications in the metadata file received at 204 to generate grammatically and syntactically correct SQL statements (PREPARE section) that can be executed by the DBMS 10 to instantiate a database schema in the DBMS and to load data into the instantiated database schema. Likewise, the generator 126 may generate correct SQL statements (EXECUTE section) that can be executed by the DBMS 10 to access and operate on the database schema, which form the basis for assessing the DBMS.

When the user wants to run a test scenario, the user may issue a command at the system console 102 to run a test scenario. The user may identify the test scenario of interest, and specify a single run or a loop run of N runs of the test scenario. The user may designate which test modules 132 to use for testing the DBMS 10. In some embodiments, for example, each test module may have a corresponding configuration file containing test instructions which control data collection by the analysis runner 106. Merely as an example, the functional stability module may have an instruction "record when statement-execution-time>5 seconds", to identify statements with slow execution times. The user may configure the configuration file to specify the kind of information to be recorded during a run.

The database analyzer 100 may then access the corresponding SQL file and execute the different sections in the accessed SQL file. Thus, at 222, the database analyzer 100 (e.g., via the analysis runner 106) may scan the accessed SQL file to identify the SQL statements in the PREPARE section of the accessed SQL file. The SQL statements may then be executed to create an instantiation of the database schema on the DBMS 10. For example, the analysis runner 106 may issue the SQL statements comprising the PREPARE section of the accessed SQL file to the DBMS 10 via the database API 12. The SQL statements may create the database schema and may insert data values into the database schema.

At 224, the database analyzer 100 may execute the EXECUTE section of the accessed SQL file to perform testing of the DBMS 10. For example, the database analyzer 100 (e.g., via the analysis runner 106) may scan the accessed SQL file to identify the SQL statements in the EXECUTE section of the accessed SQL file. In the case of a single run, the analysis runner 106 may scan through the EXECUTE section of the accessed SQL file once to send each SQL statement into to the DBMS 10. In the case of a loop run, the analysis runner 106 may scan through the EXECUTE section of the accessed SQL file as many times as the user had specified.

As the DBMS 10 performs database operations, the DBMS may generate and collect data relating to its performance, resource usage, and so on. Such information may be made available outside of the DBMS 10 via the database performance API 14. Accordingly, as the DBMS 10 operates at 224, the analysis runner 106 may gather performance data at 226 from the DBMS. The analysis runner 106 may provide the performance data, at 228, to be recorded and otherwise managed by the trace manager 108.

At the end of running a test scenario, the user may issue a command via the system console 102 to generate a report at 232. The user may delete the database schema at 242. In some embodiments, deletion of the database schema may require an explicit command from the user. Since creating a database schema may take a long time, automatically deleting the database schema after a test run may not be desirable.

Template Files

A common database language is SQL. However, many dialects of SQL have evolved over the years and different database vendors may use different SQL dialects. Accordingly, in accordance with principles of the present disclosure, template files specify the grammatical and syntactical structure of the particular dialect of SQL that the DBMS 10 uses. It will be appreciated, of course, that the template files may represent database languages other than SQL.

In some embodiments, a repository of template files may be provided for different SQL dialects. For example, one or more template files may be defined for the SQL dialects used in SAP® database systems, template files may be defined for MySQL database systems, and so on. Thus, depending on the particular DBMS 10 being assessed, the user may select a predefined template file that specifies the SQL grammar and syntax for that DBMS. Some DBMS's may support multiple languages, in which case there may be template files, one for each language. In some embodiments, a template builder tool may be provided to allow the user to modify a predefined template file to modify the SQL grammar or syntax, if a particular DBMS is not supported by an existing template file.

Figure 3:
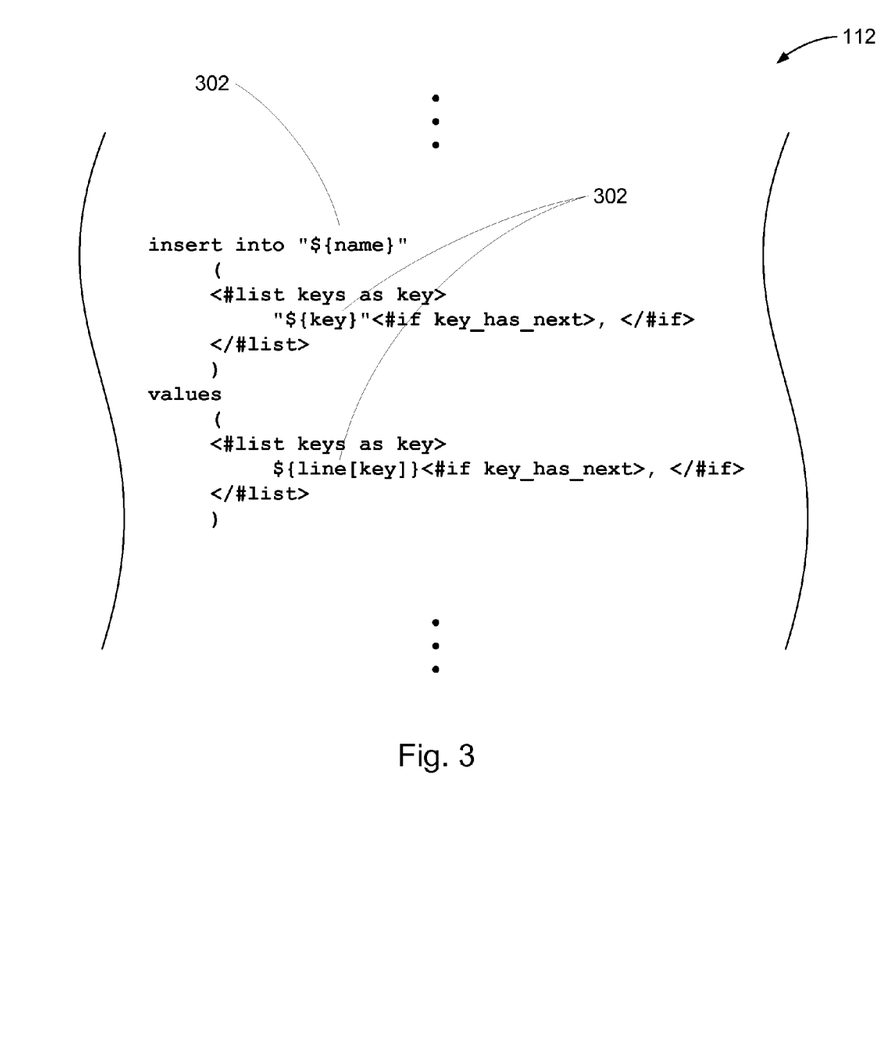
FIG. 3 represents an example of a template in accordance with principles of the present disclosure.

FIG. 3 illustrates an example of the content of a template file 112. The template file may represent the SQL statements using a suitable representational form to specify the grammar and syntax of the SQL. The example in FIG. 3 shows a fragment of the template file, illustrating the representational form for an SQL INSERT statement. The representational form may include placeholders 302 that refer to specific database table names, field names, and so on. The template file may be used by the generator 126 to generate grammatically and syntactically correct SQL statements that can be recognized by the DBMS 10. Other SQL statements can be represented in a similar way in order to specify their grammar and syntax.

Metadata Files

As explained above, the template file 112 informs the generator 126 how to generate grammatically and syntactically correct SQL statements. In accordance with the present disclosure, the metadata file 114 informs the generator 126 what SQL statements to generate. The metadata file contains information ("metadata statements") that specify operations to be performed on the DBMS 10, but not how the operations are expressed (the "how" is the job of the template file). Thus, metadata file may contain metadata statements that specify a database schema to be instantiated on the DBMS 10. For example, the metadata statements may specify the name of the database schema. The metadata statements may specify the database tables that comprise the database schema, including the name of each database table, the data fields for each database table, the data types of each data field, and so on. The metadata file may also include metadata statements for specifying operations to be performed on or accesses to be made on the instantiated database schema. The SQL statements that instantiate the database schema in the DBMS 10 constitute the PREPARE section of the SQL file 116 and SQL statements that operate on or otherwise access the instantiated database schema constitute the EXECUTE section of the SQL file.

Figure 4:
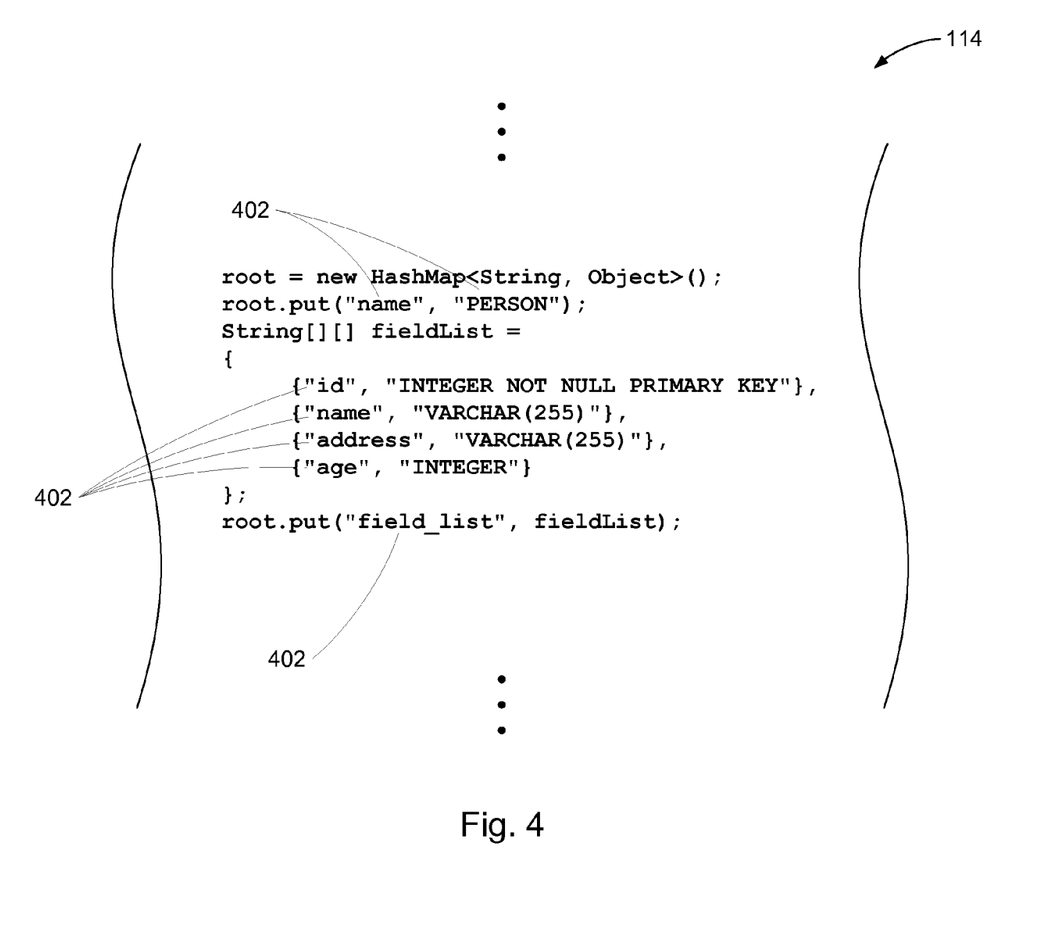
FIGS. 4 and 4A represent examples of a metadata file in accordance with principles of the present disclosure.

FIG. 4 illustrates an example of metadata statements that may be contained a metadata file 114. The metadata statements may specify instance names 402, which identify the various elements in an instance of the database schema, such as the name of the database schema, the names of the database tables comprising the database schema, the names of the data fields comprising the database tables, and so on. The instance names 402 have corresponding placeholders 302 in the template file. For example, a metadata statement that specifies an INSERT operation may specify instance names that correspond to placeholders in the representational form of the INSERT SQL statement in the template file. The generator 126 may use the representational form of the INSERT SQL statement in the template file to generate the SQL statement by replacing the placeholders with the instance names.

Figure 4A:
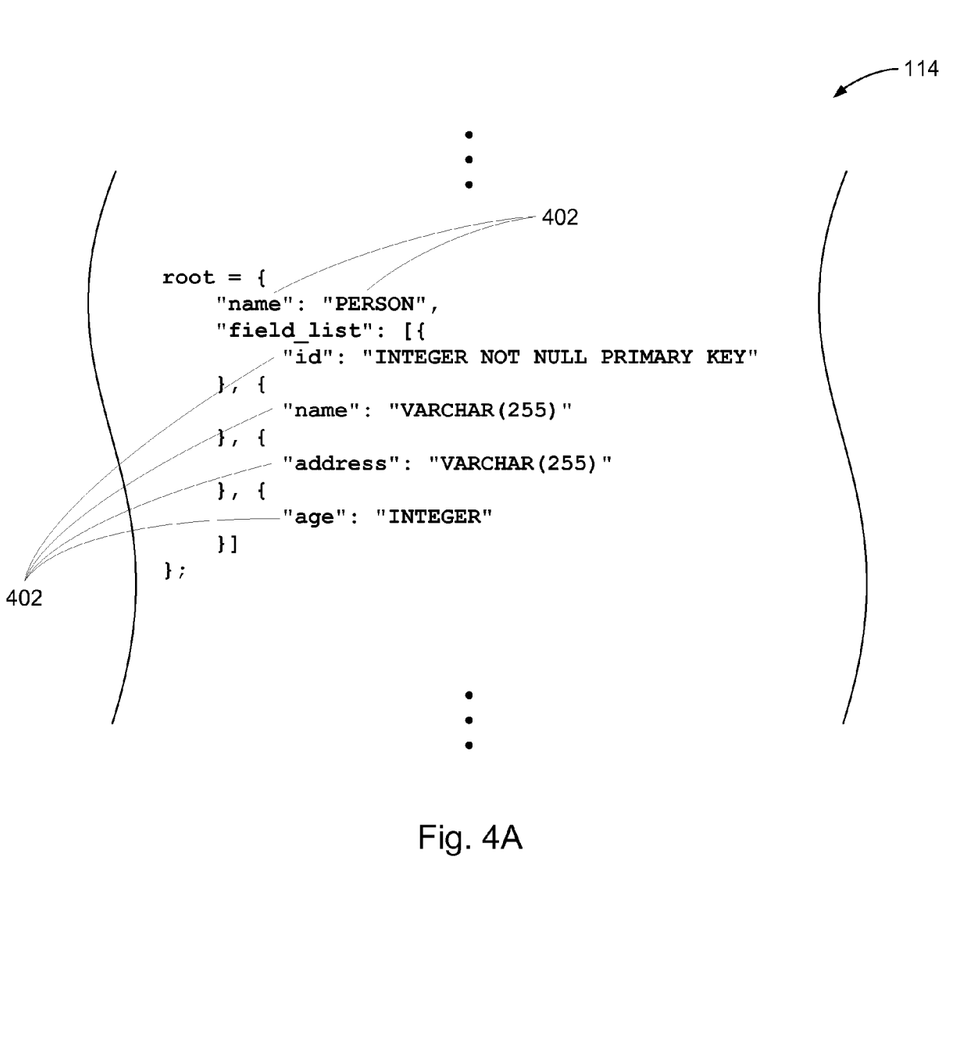

The example shown in FIG. 4 represents a fragment of a metadata file, showing the metadata statements for a database table called PERSON. As can be seen, the metadata statements also specify attributes of the constituent data fields, such as data type, data size, and so on. The metadata statements may be represented as a Java collection. FIG. 4A shows another embodiment in which the metadata statements are represented as a JavaScript Object Notation (JSON) file.

In some embodiments, the user may create a metadata file to define the database schema that they would like to instantiate on the DBMS 10 that is being evaluated. The user may specify in the metadata file the SQL statements for accessing and operating on the database schema. In other embodiments, the database analyzer 100 may include one or more predefined metadata files. Such predefined metadata files may be used to define generic test scenarios, and thus avoid the user having to develop their own test scenarios. For example, a predefined metadata file may adopt the well known "pet store" scenario used in testing J2EE applications as a generic test scenario that can be used as a standard test.

Figure 5:
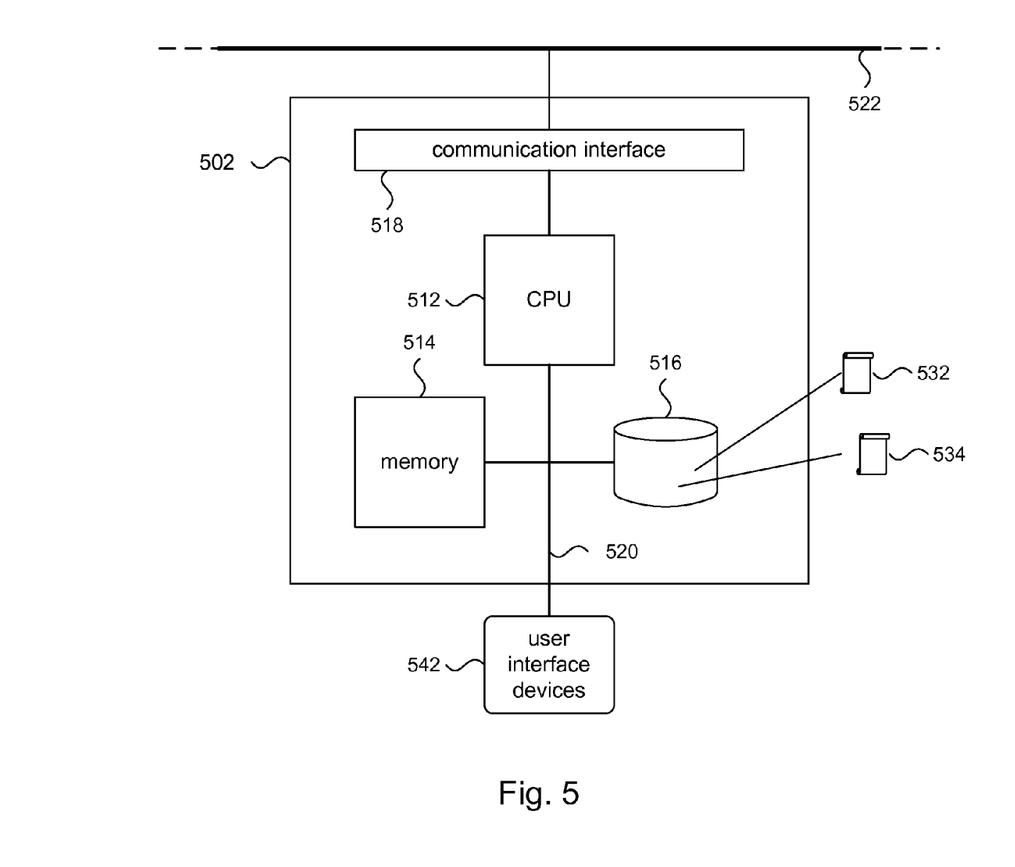
FIG. 5 shows a high level block diagram of a specific embodiment in accordance with the present disclosure.

FIG. 5 illustrates a high level block diagram of a computer system 502 that can be configured and programmed to operate as the database analyzer 100 in accordance with the present disclosure. The computer system 502 may include a central processing unit (CPU) 512 or other similar data processing component. The CPU 512 may be a single processor or a multiprocessor subsystem. The computer system 502 may include various memory components. For example, the memory components may include a volatile memory 514 (e.g., random access memory, RAM) and a data storage device 516. A communication interface 518 may be provided to allow the computer system 502 to communicate over a communication network 522, such as a local area network (LAN), the Internet, and so on. An internal bus 520 may interconnect the components comprising the computer system 502.

The data storage device 516 may comprise a non-transitory computer readable medium having stored thereon computer executable program code 532. The computer executable program code 532 may be executed by the CPU 512 to cause the CPU to perform steps of the present disclosure, for example the steps set forth in FIG. 2. The data storage device 516 may store data structures 534 such as object instance data, runtime objects, and any other data described herein. In some embodiments, for example, the data structures 534 may include template files 112, metadata files 114, and SQL files 116.

A user (e.g., database administrator) may interact with the computer system 502 using suitable user interface devices 542. They may include, for example, input devices such as a keyboard, a keypad, a mouse or other pointing device, and output devices such as a display. In some embodiments, the user interface devices 542 may comprise display device and a keyboard to access the system console 102 via a command line interface.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Advantages and Technical Effect

The database analyzer of the present disclosure provides a diversity of analysis modules, such as stability, performance, memory usage and so on. The use of templates and metadata reduces the user's effort in setting up simulations of existing database behavior. The templates may support existing popular databases such as SQL, MySQL, Oracle, MaxDB, etc. The user can edit the template (e.g., using a template builder tool) to customize a template and thus cover a wide range of SQL dialects. The user can edit the metadata to implement arbitrary and complex logic. This allows the user to design test scenarios to identify potential processing and memory bottlenecks in the DBMS that is being tested.

For system architects or application developers, the database analyzer 100 can be used as a professional tool for doing case analysis. Detailed analysis reports including performance comparison and stability test can help them to make a correct decision as to which backend database solution should be used.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method for assessing a plurality of database (DB) systems comprising:
    identifying a plurality of DB systems, each implemented using a different set of hardware environments and application requirements, the plurality of DB systems include at least one in-memory database;
    for each DB system in the plurality of DB systems, storing a plurality of template files, wherein each template file in the plurality of template files describes a different set of grammar and syntax for one or more DB statements of a DB language corresponding to the DB system and each template file comprises a plurality of DB statements expressed in the DB language of its corresponding DB system, wherein at least one of the DB statements is configured to define a DB schema in the corresponding DB system using placeholders in place of actual names of data tables that comprise the DB schema;
    for a given DB system:
        receiving a template file from among the plurality of template files that corresponds to the given DB system;
        receiving a metadata file that contains metadata for a DB schema including metadata for one or more DB tables of the DB schema and metadata for data fields of the DB tables;
        generating DB statements using the template file and the metadata file, including substituting placeholders in the template file with actual names from the metadata file according to the grammar and syntax specified in the template file;
        creating first DB statements configured to create an instance of the DB schema and second DB statements configured to perform operations on the DB tables of the DB schema;
        instantiating the DB schema on the DB system by executing the first DB statements;
        executing the second DB statements to perform operations on the DB tables of the DB schema; and
        reporting on the DB system's performance of execution of the second DB statements, including memory usage of the DB system when executing the second DB statement; and
    comparing performance of each DB system in the plurality of DB systems for analysis by a user.

2. The method of claim 1 wherein the first DB statements insert data values into the DB tables.

3. The method of claim 1 further comprising obtaining data values to be inserted into the DB tables of the DB schema, wherein the first DB statements include DB statements that insert the data values into the DB tables.

4. The method of claim 3 further comprising receiving the data values from an existing database system.

5. The method of claim 3 wherein at least some of the data values are randomly generated.

6. The method of claim 1 further comprising collecting performance data from the DB system during execution of the second DB statements.

7. The method of claim 1 further comprising repeating execution of the second DB statements one or more times and reporting on the DB system's performance of executing the second DB statements multiple times.

8. The method of claim 1 wherein the metadata file is one among a plurality of predefined metadata files.

9. The method of claim 1 wherein the DB statements include third DB statements that delete the DB schema from the DB system, the method further comprising deleting the DB schema from the DB system by executing the third DB statements subsequent to executing the second DB statements.

10. The method of claim 1, wherein the performance of each DB system in the plurality of DB system is measured during a single run of the second DB statements.

11. A system for assessing a plurality of database (DB) systems comprising:
    a computer system; and
    a data storage system having stored thereon computer executable program code, which, when executed by the computer system, causes the computer system to:
    identify a plurality of DB systems, each implemented using a different set of hardware environments and application requirements, the plurality of DB systems include at least one in-memory database;
    for each DB system in the plurality of DB systems, store a plurality of template files, wherein each template file in the plurality of template files describes a different set of grammar and syntax for one or more DB statements of a DB language corresponding to the DB system and each template file comprises a plurality of DB statements expressed in the DB language of its corresponding DB system, wherein at least one of the DB statements is configured to define a DB schema in the corresponding DB system using placeholders in place of actual names of data tables that comprise the DB schema;
    for a given DB system:
        receive a template file from among the plurality of template files that corresponds to the given DB system;
        receive a metadata file that contains metadata for a DB schema including metadata for one or more DB tables of the DB schema and metadata for data fields of the DB tables;
        generate DB statements using the template file and the metadata file, including substituting placeholders in the template file with actual names from the metadata file according to the grammar and syntax specified in the template file;
        create first DB statements configured to create an instance of the DB schema and second DB statements configured to perform operations on the DB tables of the DB schema;
        instantiate the DB schema on the DB system by executing the first DB statements;
        execute the second DB statements to perform operations on the DB tables of the DB schema; and
        report on the DB system's performance of execution of the second DB statements, including memory usage of the DB system when executing the second DB statement; and
    compare performance of each DB system in the plurality of DB systems for analysis by a user.

12. The system of claim 11 wherein the first DB statements insert data values into the DB tables.

13. The system of claim 11 wherein the computer executable program code further causes the computer system to obtain data values to be inserted into the DB tables of the DB schema, wherein the first DB statements include DB statements that insert the data values into the DB tables.

14. The system of claim 13 wherein at least some of the data values are randomly generated.

15. The system of claim 13 wherein the computer executable program code further causes the computer system to collect performance data from the DB system during execution of the second DB statements.

16. A non-transitory computer readable storage medium for assessing a database (DB) system having stored thereon computer executable program code, which, when executed by a computer system, causes the computer system to perform steps of:

identifying a plurality of DB systems, each implemented using a different set of hardware environments and application requirements, the plurality of DB systems include at least one in-memory database;

for each DB system in the plurality of DB systems, storing a plurality of template files, wherein each template file in the plurality of template files describes a different set of grammar and syntax for one or more DB statements of a DB language corresponding to the DB system and each template file comprises a plurality of DB statements expressed in the DB language of its corresponding DB system, wherein at least one of the DB statements is configured to define a DB schema in the corresponding DB system using placeholders in place of actual names of data tables that comprise the DB schema;

for a given DB system:

receiving a template file from among the plurality of template files that corresponds to the given DB system;

receiving a metadata file that contains metadata for a DB schema including metadata for one or more DB tables of the DB schema and metadata for data fields of the DB tables;

generating DB statements using the template file and the metadata file, including substituting placeholders in the template file with actual names from the metadata file to create first DB statements configured according to the grammar and syntax specified in the template file;

creating an instance of the DB schema and second DB statements configured to perform operations on the DB tables of the DB schema;

instantiating the DB schema on the DB system by executing the first DB statements;

executing the second DB statements to perform operations on the DB tables of the DB schema; and reporting on the DB system's performance of execution of the second DB statements, including memory usage of the DB system when executing the second DB statement; and comparing performance of each DB system in the plurality of DB systems for analysis by a user.

17. The method of claim 1, wherein the performance of each DB system in the plurality of DB system is measured during a loop run run of the second DB statements.

18. The method of claim 1, wherein the performance of each DB system in the plurality of DB system is exported for comparison using a performance application program interface (API) associated with each DB system.

19. The method of claim 1, wherein the performance of each DB system in the plurality of DB system is compared in accordance with stability criteria, performance criteria, and memory usage criteria.

* * * * *